United States Patent
Furuya et al.

(10) Patent No.: US 9,601,742 B2
(45) Date of Patent: Mar. 21, 2017

(54) BUSBAR MODULE UNIT

(71) Applicant: Yazaki Corporation, Minato-ku, Tokyo (JP)

(72) Inventors: Yoshinobu Furuya, Kakegawa (JP); Shigeyuki Ogasawara, Kakegawa (JP); Hideki Inoue, Tokyo (JP)

(73) Assignee: Yazaki Corporation, Tokyo (JP)

( * ) Notice: Subject to any disclaimer, the term of this patent is extended or adjusted under 35 U.S.C. 154(b) by 81 days.

(21) Appl. No.: 14/068,853

(22) Filed: Oct. 31, 2013

(65) Prior Publication Data

US 2014/0057152 A1 Feb. 27, 2014

Related U.S. Application Data

(63) Continuation of application No. PCT/JP2012/066624, filed on Jun. 22, 2012.

(30) Foreign Application Priority Data

Jun. 22, 2011 (JP) .................................. 2011-138188

(51) Int. Cl.
*H01M 2/20* (2006.01)
*H01M 2/10* (2006.01)
*H01M 10/48* (2006.01)

(52) U.S. Cl.
CPC ......... *H01M 2/206* (2013.01); *H01M 2/1077* (2013.01); *H01M 10/482* (2013.01); *H01M 2220/20* (2013.01)

(58) Field of Classification Search
CPC .......... H01M 2/206; H01M 2/20; H01M 2/00; H01M 10/00; H02G 5/00; H01B 7/00
See application file for complete search history.

(56) References Cited

U.S. PATENT DOCUMENTS 6,290,552 B1 * 9/2001 Saito et al. ................... 439/736
2011/0064987 A1 3/2011 Ogasawara et al.
(Continued)

FOREIGN PATENT DOCUMENTS

JP          200498295 A      4/2004
JP         2006269103 A     10/2006
(Continued)

OTHER PUBLICATIONS http://dictionary.reference.com/browse/opposite?s=t, Feb. 10, 2016.*

(Continued)

*Primary Examiner* — Helen O Conley
*Assistant Examiner* — Victoria Lynch
(74) *Attorney, Agent, or Firm* — Sughrue Mion, PLLC

(57) ABSTRACT

A busbar module unit includes a busbar module that is made of a resin and retains a plurality of first conductors and two second conductor, a wiring path that accommodates a plurality of voltage detection wires, a terminal accommodating portion that accommodates connection terminals of a power cable, and a cover member that is connected to the busbar module via a hinge portion. The terminal accommodating portion is integrally formed with the cover member. The wiring path is arranged so as to intersect at least one of the connection terminals. The cover member has a first face and a second face opposite to the first face, the first face opposes the wiring path when the cover member is folded back via the hinge portion. The terminal accommodating portion is formed on the second face.

5 Claims, 11 Drawing Sheets

(56) References Cited

U.S. PATENT DOCUMENTS

2011/0097620 A1     4/2011   Kim
2014/0030581 A1     1/2014   Kim

FOREIGN PATENT DOCUMENTS

| | | |
|---|---|---|
| JP | 2006269104 A | 10/2006 |
| JP | 2010170884 A | 8/2010 |
| JP | 201165749 A | 3/2011 |
| JP | 201165863 A | 3/2011 |
| JP | 201191035 A | 5/2011 |
| WO | WO2012169373 A1 * 12/2012 | ............. H01M 2/20 |

OTHER PUBLICATIONS http://dictionary.reference.com/browse/integral?s=t, Feb. 10, 2016.*

International Search Report (PCT/ISA/210) dated Oct. 4, 2012 in International Application No. PCT/JP2012/066624.

Written Opinion (PCT/ISA/237) dated Oct. 4, 2012 in International Application No. PCT/JP2012/066624.

Office Action dated Apr. 29, 2015, issued by the Japanese Intellectual Property Office in counterpart Japanese Application No. 2011-138188.

* cited by examiner

BUSBAR MODULE UNIT

CROSS REFERENCE TO RELATED APPLICATIONS

This application is a continuation of PCT application No. PCT/JP2012/066624, which was filed on Jun. 22, 2012 based on Japanese Patent Application (No. P2011-138188) filed on Jun. 22, 2011, the contents of which are incorporated herein by reference.

BACKGROUND OF THE INVENTION

1. Field of the Invention

The present invention relates to a busbar module unit which connects a plurality of batteries in series.

2. Description of the Related Art

For example, in JP-A-2004-98295, a technique of using a battery module which connects a plurality of batteries in series as a power supply of an electric vehicle, a hybrid vehicle, or the like is disclosed. In the battery module, a busbar module made of a resin, which is formed by retaining a plurality of first busbars that connect the positive electrode and the negative electrode of adjacent batteries, and a second busbar which is connected to both of the total positive electrode and the total negative electrode of a battery module is mounted.

FIG. 11 illustrates a busbar module unit 51 disclosed in JP-A-2004-98295. The busbar module structure 51 includes a plurality of first busbars 53 that connect the positive electrodes and the negative electrodes of adjacent batteries (not shown), second busbars 55 (only one is illustrated) respectively connected to the total positive electrode and the total negative electrode of the battery module unit, a wiring path 57 that accommodates a plurality of voltage detection wires (not shown) connected to the plurality of first busbars 53 and the second busbars 55, a power cable 61 that is connected via the second busbar 55 and a connection terminal 59, and a busbar module 63 made of a resin. The wiring path 57 is formed along the longitudinal direction of the busbar module 63.

The first busbars 53 are fitted in a plurality of first enclosure walls 67 connected to one another via hinges 65 so as to be retained therein. The second busbars 55 are respectively fitted in second enclosure walls 69 (only one is illustrated) provided at one end and the other end of the busbar module unit 51 along with the connection terminals 59 so as to be retained therein. All the hinges 65, the first enclosure walls 65, and the second enclosure walls 67 are integrally formed with the busbar module 63. The voltage detection wires are accommodated and routed in the wiring path 57, and the power cable 61 is held by a plurality of hooks 71 so as to be routed. That is, the power cable 61 and the voltage detection wires are routed in the same direction as the longitudinal direction (the right direction of FIG. 11) of the busbar module unit 51.

SUMMARY OF THE INVENTION

However, in the structure of the busbar module unit, as in JP-A-2004-98295, without the limitation to the structure in which the power cable 61 and the voltage detection wires are routed in the same direction, a structure in which the power cable and the voltage detection wires are routed in the opposite directions may be considered. In this case, for example, a structure may occur in which at least one connection terminal of the connection terminals of the power cable installed on both end sides in the longitudinal direction of the busbar module intersects the voltage detection wires.

In the case where the contact terminal and the voltage detection wires intersect to each other, if vibration is transmitted from the outside in a state where the voltage detection wires come in contact with the connection terminal, there is a concern that the sheath of the voltage detection wires may be worn and the conductor thereof may be exposed. In order to avoid this situation, for example, a case may be considered in which an accommodation part (corresponding to the second enclosure wall 69 of FIG. 11) that accommodates the connection terminals is formed to extend over the wiring path of the voltage detection wires. However, such structure is complex, and thus it becomes difficult to form the structure in one body through injection molding or the like. In addition, even though such a structure is formed, there is a problem in that the size of the busbar module increases.

An object of the present disclosure is to avoid contact between a voltage detection wire and a connection terminal of a power cable while suppressing the complexity of a structure of the busbar module unit.

In order to accomplish the object, according to the present disclosure, there is provided a busbar module unit comprising:

a plurality of first conductors that connect positive electrodes and negative electrodes of the adjacent batteries of a plurality of batteries connected in series;

two second conductors respectively connected to a total positive electrode and a total negative electrode of a battery module constituted by the plurality of batteries;

a busbar module that is made of a resin and retains the plurality of first conductors and the two second conductor in accordance with an arrangement of the batteries;

a wiring path that accommodates a plurality of voltage detection wires respectively connected to the plurality of first conductors; and a terminal accommodating portion that accommodates connection terminals of a power cable respectively connected to the two second conductors; and a cover member that is connected to the busbar module via a hinge portion, wherein the wiring path is integrally formed with the busbar module;

wherein the terminal accommodating portion is integrally formed with the cover member;

wherein the wiring path is arranged so as to intersect at least one of the connection terminals of the power cable;

wherein the cover member has a first face and a second face opposite to the first face;

wherein the first face of the cover member opposes the wiring path to cover the wiring path when the cover member is folded back with respect to the wiring path via the hinge portion; and wherein the terminal accommodating portion is formed on the second face.

According to this configuration, as the connection terminal is provided in the terminal accommodating portion of the folded-back cover member, the cover member may be interposed between the connection terminal and the voltage detection wires. Therefore, the contact between the connection terminal and the voltage detection wires is avoided, thereby preventing the wear of the sheaths of the voltage detection wires. In addition, as the cover member is provided to extend in a direction in the plane of the busbar module, the complexity of the structure of the busbar module may be suppressed. Therefore, it is possible to form the cover member integrally with the busbar module through molding. Moreover, even though the surface of the folded-back cover member on the side opposing the wiring path is arranged to be pressed against the wiring path, wear of the sheaths of the voltage detection wires does not occur. Therefore, an unnecessary gap between the folded-back cover member and the busbar module may not be needed, and an increase in the size of the busbar module may be suppressed.

For example, the wiring path is provided with a rib which guides the voltage detection wires.

Accordingly, the voltage detection wires accommodated in the wiring path may be brought close to a predetermined direction, for example, the inside of the wiring path from the side edge of the wiring path by the rib. Therefore, the voltage detection wires may be prevented from being caught between the side edge of the wiring path and the cover member when the cover member is folded back.

For example, a side edge portion of the wiring path is provided with a groove communicating with the wiring path, a protrusion that is inserted and retained in the groove is provided on the first face of the cover member, and an inclined surface is formed on a side surface of the protrusion facing the wiring path so that the cross-section of the protrusion is increased from an apex side toward a base end side of the protrusion.

Accordingly, when the protrusion of the cover member is inserted into the groove, the voltage detection wires positioned in the vicinity of the groove may be moved in a direction further away from the groove along the inclined surface of the protrusion, so that the voltage detection wires may be prevented from being caught on the locking protrusion.

According to the present disclosure, a contact between the voltage detection wires and the connection terminal of the power cable may be avoided while suppressing the complexity of the structure.

DETAILED DESCRIPTION OF THE EXEMPLARY EMBODIMENTS

Hereinafter, an embodiment of a busbar module unit according to the present disclosure will be described with reference to the drawings.

Figure 10:
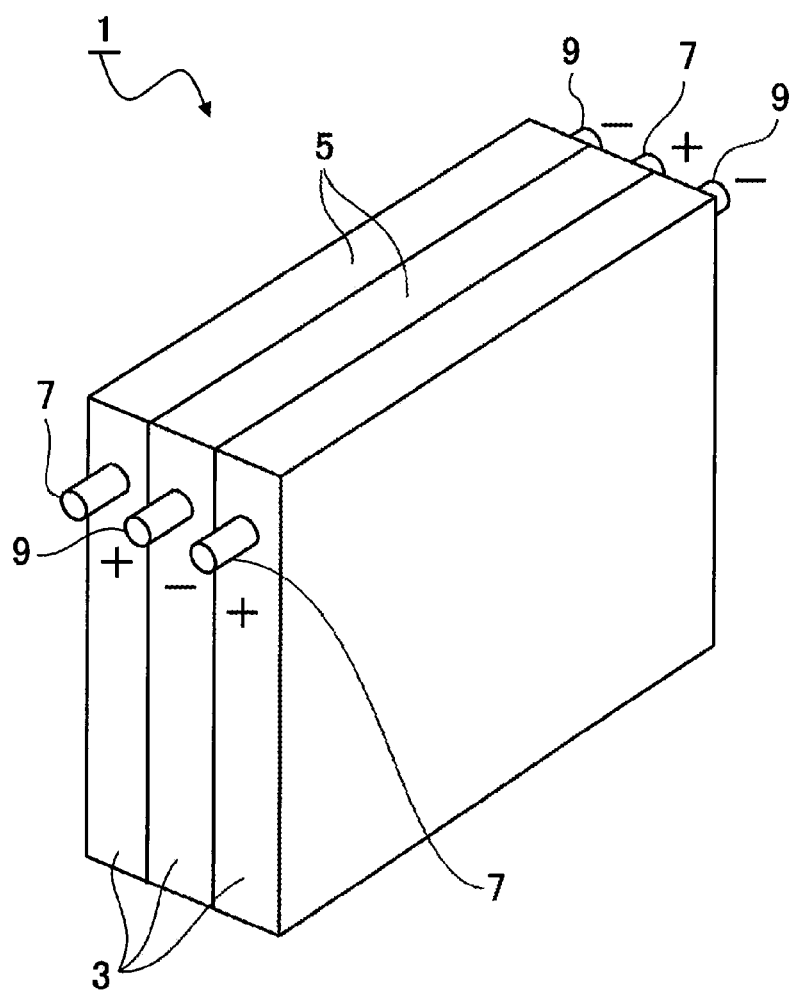
FIG. 10 is a schematic diagram of a battery module to which a busbar module according to the present disclosure is mounted.
Figure 11:
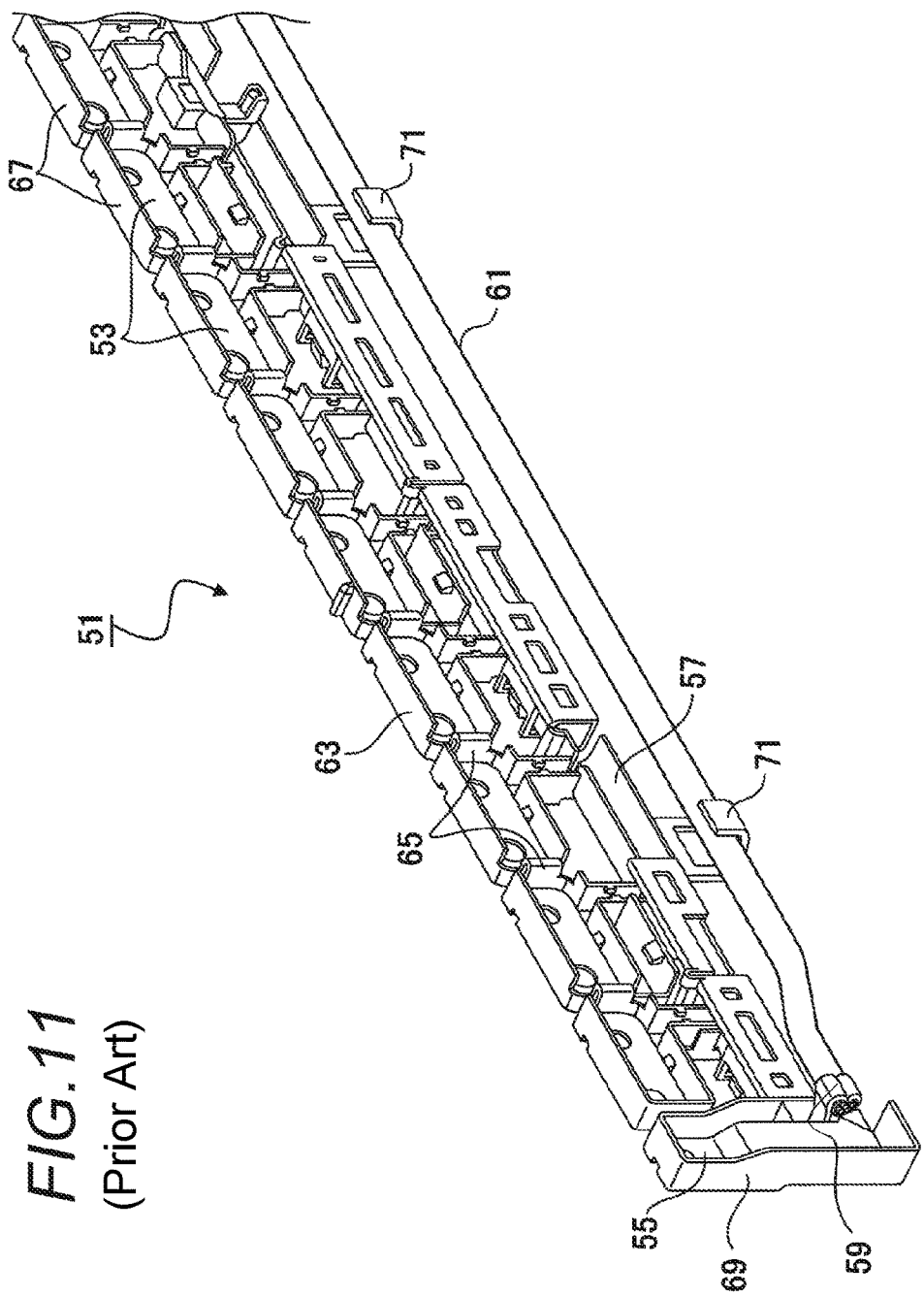
FIG. 11 is a diagram illustrating a busbar module unit according to a related art.

Initially, for facilitating the description of the busbar module unit of the present disclosure, the configuration of a battery module to which the busbar module unit is mounted will be described with reference to FIG. 10.

A battery module 1 is configured to include two opposing electrode surfaces 5 of each of a plurality of batteries 3 formed as rectangular parallelepipeds so that the electrode surfaces 5 are in the same direction. A positive electrode 7 and a negative electrode 9, each of which has a cylindrical shape, protrude from the electrode surfaces of each of the batteries 3 so that the positive electrode 7 and the negative electrode 9 are alternately arranged at the adjacent batteries 3. In the battery module 1, the electrodes of the batteries 3 positioned at both ends of the plurality of batteries 3 connected in series serve as total electrodes. For example, in the case where an even number of batteries 3 are connected in series, the positive electrode of the battery 3 at one end serves as the total positive electrode, and the negative electrode of the battery at the other end serves as the total negative electrode. In this embodiment, the battery module 1 in which an even number of batteries 3 are connected in series is exemplified.

Figure 1:
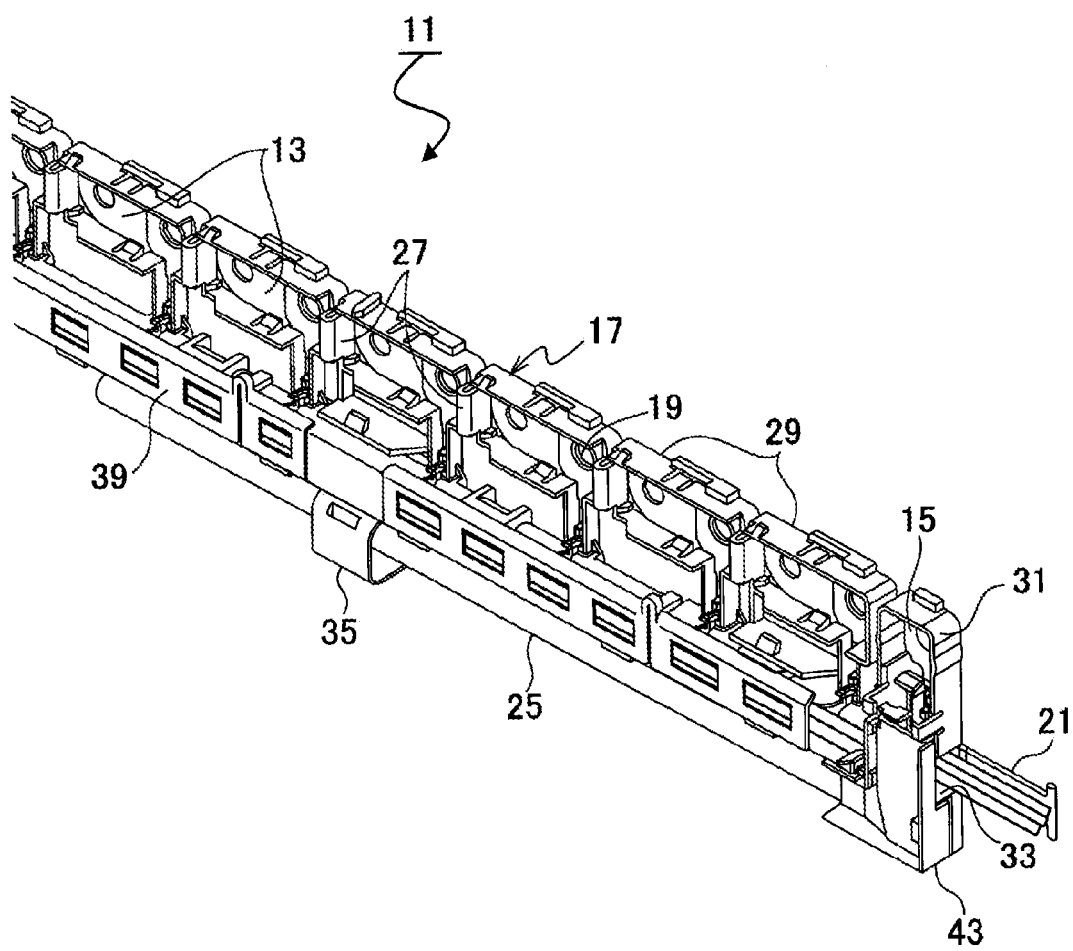
FIG. 1 is a diagram illustrating a state where a power cable is routed in a busbar module unit according to the present disclosure.
Figure 2:
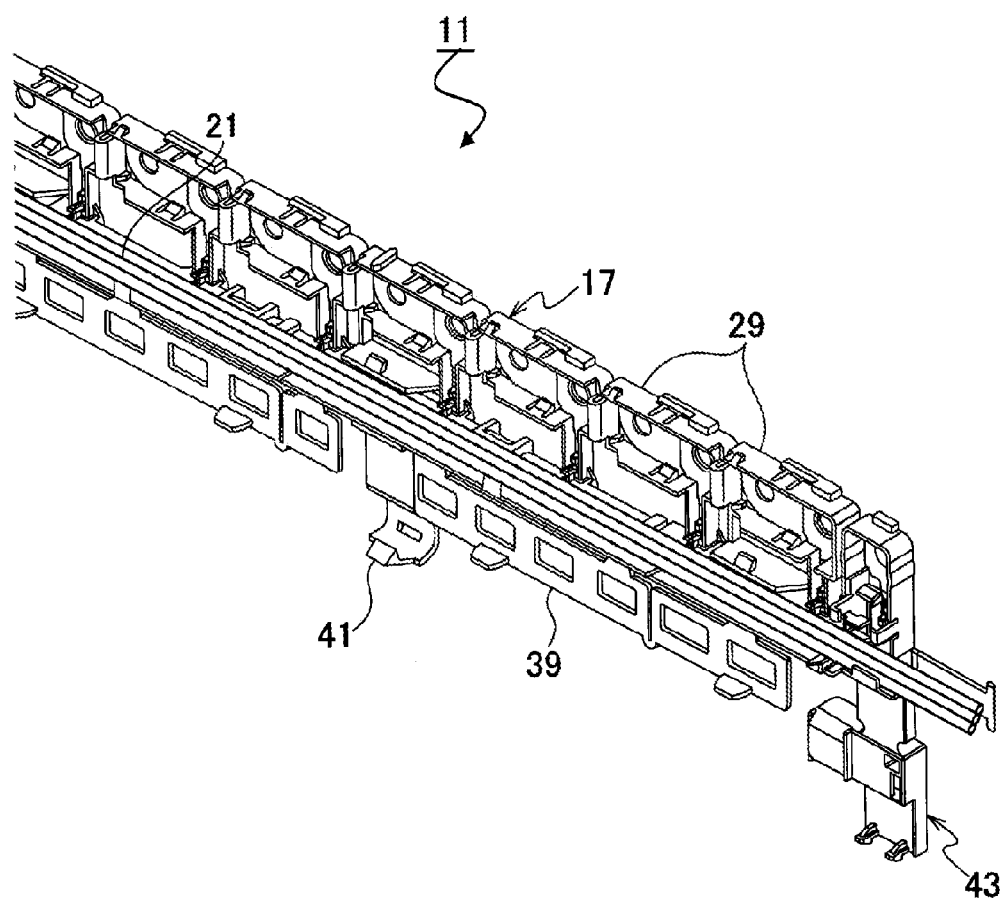
FIG. 2 is a diagram illustrating a state before the power cable is routed in the busbar module unit according to the present disclosure.

As illustrated in FIGS. 1 and 2, a busbar module unit 11 includes a plurality of first busbars 13 that connect the positive electrodes 7 and the negative electrodes 9 of the adjacent batteries 3 of the battery module 1, two second busbars 15 that are respectively connected to the total positive electrode and the total negative electrode of the batteries 3 at both ends of the battery module 1, a busbar module 17 made of a resin, which retains the first busbars 13 and the second busbars 15, a plurality of voltage detection wires 21 which are connected to all the first busbars 13 and the second busbars 15 via corresponding terminals 19 for voltage detection, and a power cable 25 that is connected to the second busbars 15 via respective connection terminals 23 (LA terminals: ring terminals). In FIG. 1, the connection terminals 23 are omitted due to illustrate a rear face of a cover member 43.

The first busbars 13 are respectively fitted and retained in a plurality of first enclosure walls 29 which are connected to one another via connection portions 27. The second busbars 15 are respectively fitted and retained in second enclosure walls 31 which are respectively provided at both ends of the busbar module 17. All the connection portions 27, the first enclosure walls 29, and the second enclosure walls 31 are integrally formed with the busbar module 17. In addition, although one of the second enclosure walls 31 is illustrated, the other second enclosure wall 31 has the same structure, so that description thereof will be omitted.

The voltage detection wires 21 are accommodated and routed in a wiring path 33 formed along the longitudinal direction of the busbar module 17. The power cable 25 is held by a plurality of hooks 35 formed in the busbar module 17 and is routed in the longitudinal direction of the busbar module 17.

Each of the busbars is a conductor, for example, a plate-like member made of copper, the first busbar 13 is provided with two holes respectively passing through the positive electrode and the negative electrode, and the second busbar 15 is provided with a single hole passing through the total positive electrode or the total negative electrode. One of the holes of the first busbar 13 and the hole of the second busbar 15 are arranged to overlap the hole of the terminal 19 for voltage detection, which is made of a conductor, for example, a plate-like member made of copper. The terminal 19 for voltage detection is provided with a crimping portion (not shown), and the voltage detection wire 21 of which the core wire is exposed by peeling off the insulating sheath is connected to the crimping portion. The voltage detection wire 21 is connected to a voltage detector (not shown) to detect the voltage of each of the batteries 3.

In the busbar module 17, two holes through which the positive electrode 7 and the negative electrode 9 of each of the batteries 3 of the battery module 1 are inserted are provided in each of the plurality of first enclosure walls 29. A single hole through which the total positive electrode or the total negative electrode of the battery module 1 is inserted is provided in each of the second enclosure walls 31 at both the ends. The entire size of the busbar module 17 is formed so as to have a size corresponding to the electrode surfaces 5 of the battery module 1.

When the busbar module unit 11 configured as described above is mounted to the battery module 1, the positive electrode 7 and the negative electrode 9 of the battery 3 inserted through the two holes of the first enclosure wall 29 are inserted through the two holes of the first busbar 13, and one of the electrodes is fastened by, for example, a nut in a state of being inserted through the single hole of the terminal 19 for voltage detection. On the other hand, the total positive electrode or the total negative electrode inserted through the hole of the second enclosure wall 31 is fastened by, for example, a nut in a state of being inserted through the holes of the second busbar 15, the terminal 19 for voltage detection, and the connection terminal 23.

The wiring path 33 of the busbar module 17 is formed in a tubular shape by folding back a cover 39 extending in the lateral direction (the vertical direction in FIG. 1) of the busbar module 17. As illustrated in FIG. 2, at the front end of the cover 39, a protrusion 41, which is locked by the busbar module 17 in a state where the cover 39 is folded back is provided. As the cover 39 is folded back in the state where the voltage detection wires 21 are accommodated in the wiring path 33 and the protrusion 41 is inserted into a locking groove (not shown) so as to be locked, the voltage detection wires 21 are in a state of being protected in the wiring path 33. The power cable 25 is routed on the opposite side to the first enclosure walls 29 and the second enclosure walls 31 with the wiring path 33 interposed therebetween.

In this embodiment, the voltage detection wires 21 accommodated in the wiring path 33 are routed toward one side in the longitudinal direction of the busbar module 17 (to the right side in FIG. 1), whereas the power cable 25 is routed toward the other side in the longitudinal direction of the busbar module 17 (to the left side in FIG. 1). That is, the voltage detection wire 21 and the power cable 25 are routed in the reverse directions. Therefore, in order to connect the terminal of the power cable 25 to the second busbar 15 mounted to the second enclosure wall 31 positioned so that the voltage detection wire 21 is arranged between the second enclosure wall 31 and the power cable 25, the connection terminal 23 connected to the terminal of the power cable 25 has to be arranged to intersect the wiring path 33. In this case, as vibration is transmitted from the outside in the state where the voltage detection wires 21 accommodated in the wiring path 33 come in contact with the connection terminal 23, there is a concern that the sheath of the voltage detection wires 21 may be worn and the conductor thereof may be exposed. The structure in which the connection terminal 23 intersects the wiring path 33 as such may occur at at least one point (one point in the example of FIG. 1) in the busbar module unit 11. However, depending on the structure of the battery module 1, the structure occurs at two points.

Here, the features and the configurations of this embodiment will be described with reference to FIGS. 3 to 5.

Figure 3:
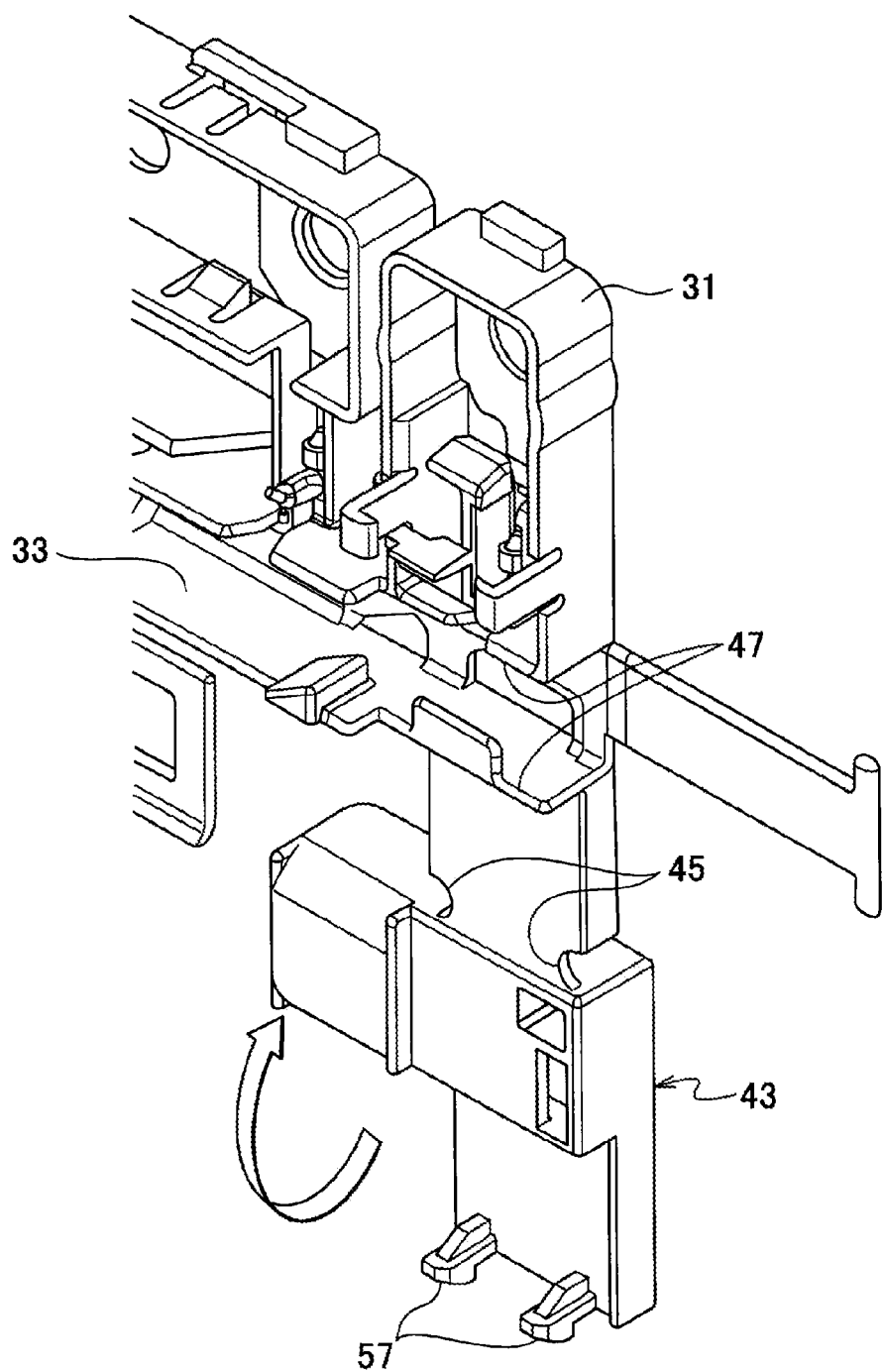
FIG. 3 is an enlarged view of a cover member of the busbar module unit according to the present disclosure.

As illustrated in FIG. 3, in this embodiment, the cover member 43 is provided to extend in the lateral direction of the busbar module 17, that is, in the direction in which the second enclosure wall 31 intersects the wiring path 33. The cover member 43 is integrally formed with the busbar module 17, and is bendable in a direction of the arrow in FIG. 3 via hinges (hinge portions) 45. The cover member 43 intersects the wiring path 33 while covering a part of the wiring path 33 when the cover member 43 is folded back via the hinges 45. That is, the folded-back cover member 43 abuts the end surfaces of two side walls 47 forming the wiring path 33.

Figure 4:
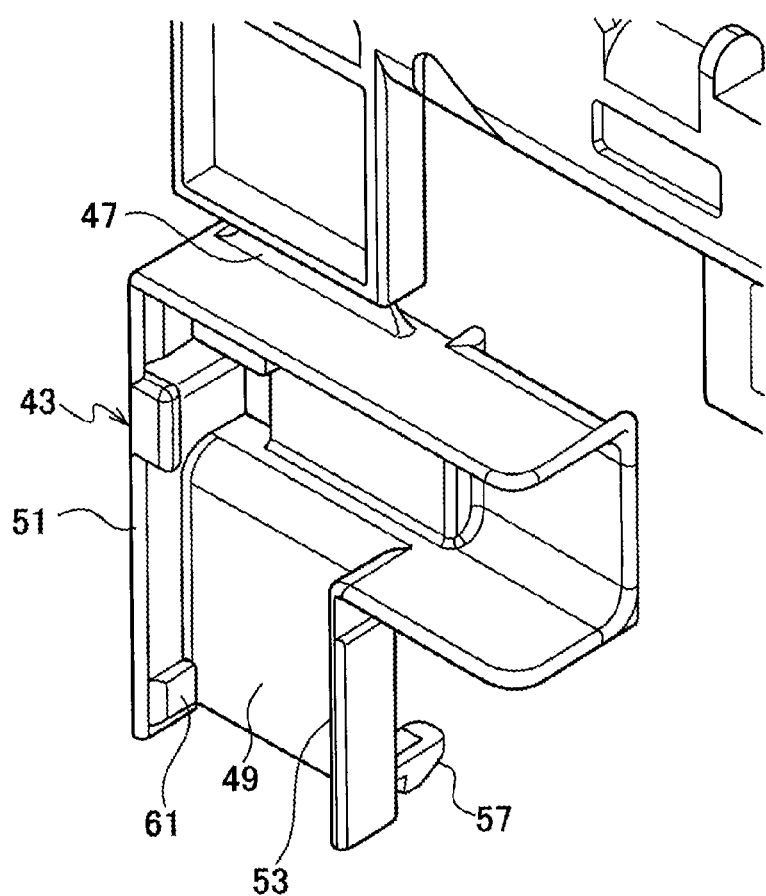
FIG. 4 is a diagram illustrating a terminal accommodating portion formed on a rear side of a cover member of FIG. 3.

FIG. 4 illustrates the rear side of the cover member 43 of FIG. 3. The rear face (second face) of the rear side of the cover member 43 is positioned on the opposite side of a front face (second face) on a side opposing the wiring path 33 when the cover member 43 is folded back. A terminal accommodating portion 49 for accommodating the connection terminal 23 is formed on the rear face. The terminal accommodating portion 49 is configured by two side walls 51 and 53 that oppose at a predetermined interval in an L shape, and an L-shaped groove portion is formed on the inside of the side walls 51 and 53. In addition, as illustrated in FIG. 3, on the rear side of the terminal accommodating portion 49, two lock pins 57 which are inserted into grooves (not shown) provided on the inside of the second enclosure wall 31 are provided to stand erect. The lock pins 57 are inserted and locked in the grooves.

Next, operations of assembling the busbar module unit 11 configured as described above will be described.

First, the first busbars 13 and the second busbars 15 are accommodated in and fixed to the first enclosure walls 29 and the second enclosure walls 31 of the busbar module 17, respectively. Here, the first busbars 13 and the second busbars 15 may be integrally formed with the busbar module 17. Subsequently, the terminals 19 for voltage detection in which the voltage detection wires 21 are crimped in advance are caused to overlap the corresponding busbars to be accommodated in the first enclosure walls 29 and the second enclosure walls 31. In addition, the voltage detection wires 21 connected to each of the terminals 19 for voltage detection are routed while being accommodated in the wiring path 33 and are drawn to the outside of the busbar module 17 from a drawing portion of the wiring path 33. After the voltage detection wires 21 are drawn to the outside, the cover 39 is folded back so as to be fixed.

Next, the cover member 43 is folded back via the hinges 45, and the two lock pins 57 are inserted and locked in the corresponding grooves, thereby fixing the cover member 43. Subsequently, as illustrated in FIG. 5, the L-shaped connection terminal 23 to which the terminal of the power cable 25 is crimped in advance is mounted to the groove portion of the terminal accommodating portion 49. Here, as the connection terminal 23 is accommodated in the groove portion, a hole 59 formed on the front end side overlaps the holes of the second busbar 15 and the terminal 19 for voltage detection, which are accommodated in the second enclosure wall 31 in advance. As the connection terminal 23 is pressed against protrusions 61 respectively formed on the inner walls of the two side walls 51 and 53 from both sides, the connection terminal 23 is fixed in a state of being positioned in the terminal accommodating portion 49. Subsequently, the power cable 25 is fixed to the plurality of hooks 35 so as to be supported in the routing direction.

Figure 5:
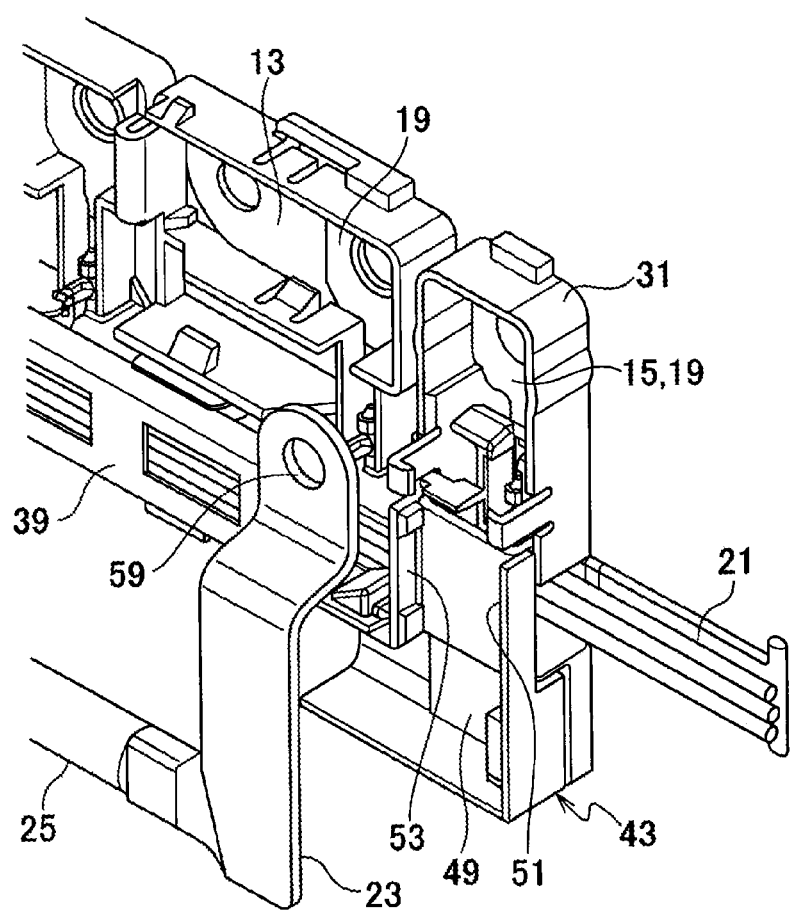
FIG. 5 is a diagram for explaining an operation of mounting a connection terminal in a state where the cover member of FIG. 3 is folded back.

As illustrated in FIG. 5, the connection terminal 23 according to this embodiment is formed in L shape, and is formed to be bent in, for example, a hook shape toward the front end side where the hole 59 is formed. That is, one end side of the connection terminal 23 is connected to the total electrode of the battery 3 at the second enclosure wall 31, and the other end side thereof is in a state of being accommodated in the groove portion of the terminal accommodating portion 49 disposed by covering the two side walls 47 of the wiring path 33.

As described above, as the connection terminal 23 is accommodated and retained in the groove portion of the terminal accommodating portion 49 formed in the folded-back cover member 43, the cover member 43 is interposed between the connection terminal 23 and the voltage detection wire 21, so that the contact between the intersecting connection terminal 23 and the voltage detection wire 21 is reliably avoided and thus the wear of the sheath of the voltage detection wire 21 may be prevented. In addition, the cover member 43 is extend in a plane direction, that is, the lateral direction of the busbar module 17 rather than the thickness direction of the busbar module 17, so that the busbar module 17 may be suppressed from becoming complex and being increased in size. Moreover, it is possible to integrally form the cover member 43 with the busbar module 17.

Next, an example of the specific structure of the inside of the wiring path 33 where the voltage detection wires 21 are accommodated will be described with reference to FIGS. 6 and 7.

Figure 6:
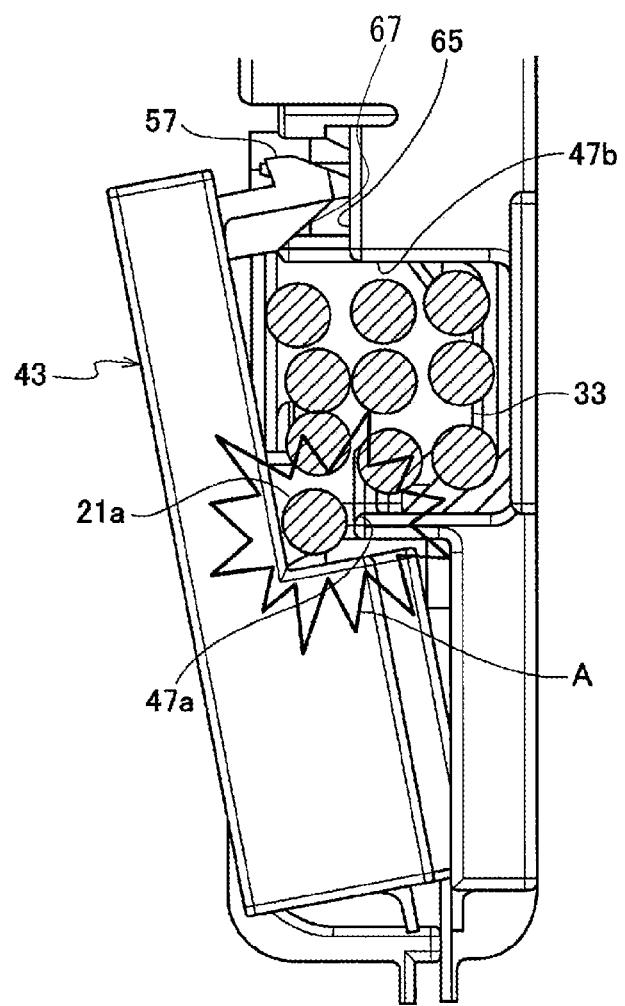
FIG. 6 is a cross-sectional view for explaining a state where a voltage detection wire accommodated in a wiring path is caught by the cover member.

As illustrated in FIG. 6, the plurality of voltage detection wires 21 are accommodated in the wiring path 33 with a high wire occupancy ratio. Therefore, when the cover member 43 is folded back in a state where a part of a voltage detection wire 21a protrudes in the vicinity of the side edge where the wiring path 33 opens, there is a concern that the voltage detection wire 21 may be caught between a side wall 47a of the wiring path 33 and the cover member 43 (the portion A of FIG. 6). In this case, not only the voltage detection wires 21 are damaged, but also the voltage detection wires 21 have to be pushed into the wiring path 33 every time. Therefore, the burden during assembly is increased.

Figure 7:
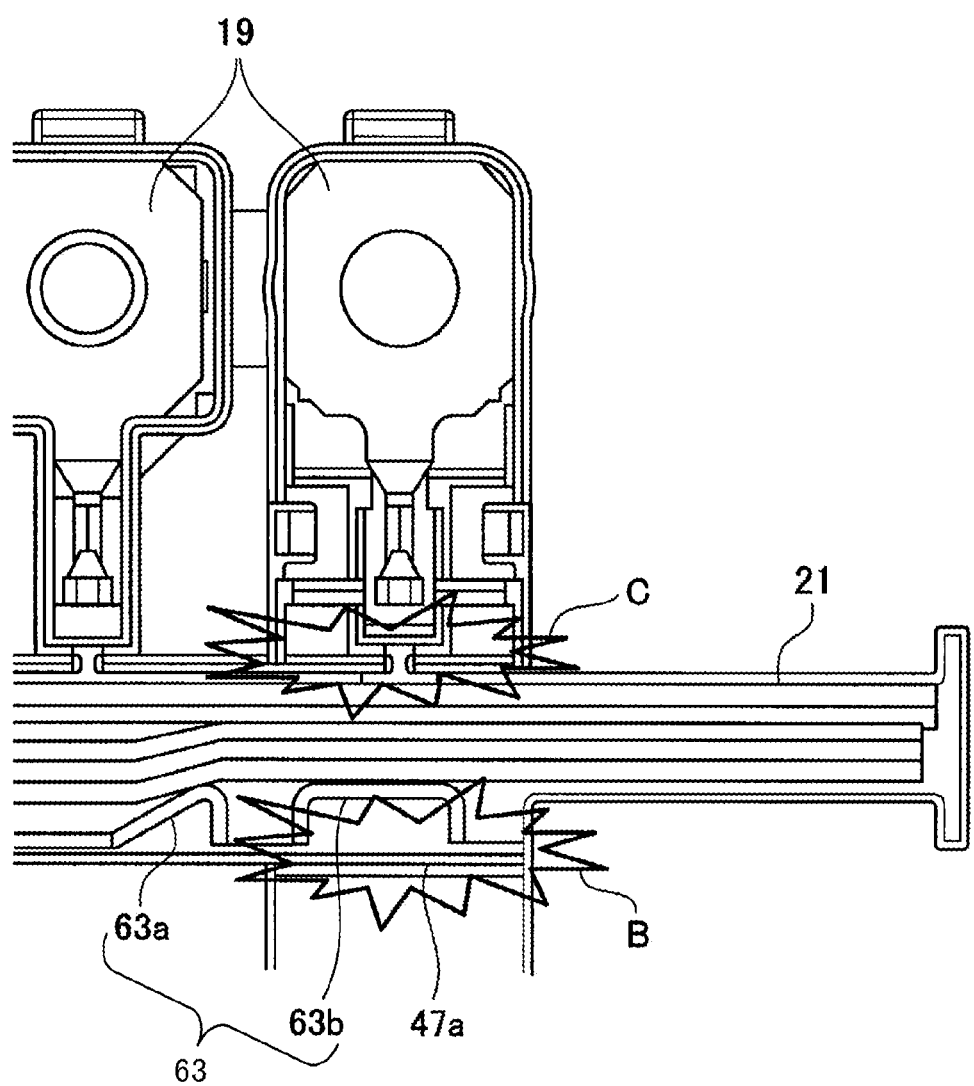
FIG. 7 is a diagram for explaining a state where the voltage detection wires accommodated in the wiring path are regulated by ribs.

However, according to this embodiment, as illustrated in FIG. 7, a rib 63 that guides the voltage detection wires 21 to a desired position is provided in at least one of the bottom surface of the wiring path 33 and the side wall 47. The mounted position, the shape, and the number of ribs 63 are not limited as long as the ribs 63 can keep the voltage detection wires 21 distant from the vicinity of the side wall 47a of the wiring path 33 in which the voltage detection wires 21 are easily caught.

In FIG. 7, two ribs 63a and 63b that are respectively formed in a V shape and a U shape as viewed from the opening side of the wiring path 33 are erected from the bottom surface of the wiring path 33 at a position in the vicinity of the side wall 47a close to the hinge 45 so that the voltage detection wires 21 are routed to be distant from the vicinity of the side wall 47a (the portion B of FIG. 7) close to the hinge 45 of the cover member 43 at the position where the wiring path 33 and the cover member 43 intersect each other. Accordingly, the voltage detection wires 21 accommodated in the wiring path 33 are guided in a direction further away from the side wall 47a by the first rib 63a before reaching an area intersecting the cover member 43 of the wiring path 33, are subsequently guided by the second rib 63b in the area intersecting the cover member 43 of the wiring path 33, and are routed in a state of having a predetermined interval from the side wall 47a. Therefore, when the cover member 43 is folded back, the voltage detection wires 21 are reliably prevented from being caught between the side wall 47a of the wiring path 33 and the cover member 43.

On the other hand, in the vicinity (the portion C of FIG. 7) of a side wall 47b opposing the side wall 47a close to the hinge 45 at the position where the wiring path 33 and the cover member 43 intersect each other, a groove 65 into which a lock pin 57 of the cover member 43 is inserted is provided so as to communicate with the wiring path 33 (FIG. 6). There is a concern that, when the lock pin 57 is inserted into the groove 65, the voltage detection wire 21 protruding from the wiring path 33 may be caught between the lock pin 57 and the groove 65.

Figure 8:
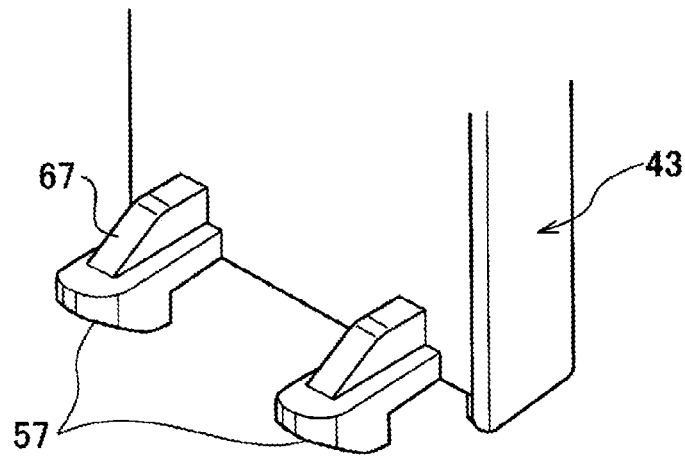
FIG. 8 is an enlarged view of lock pins formed on the cover member.
Figure 9:
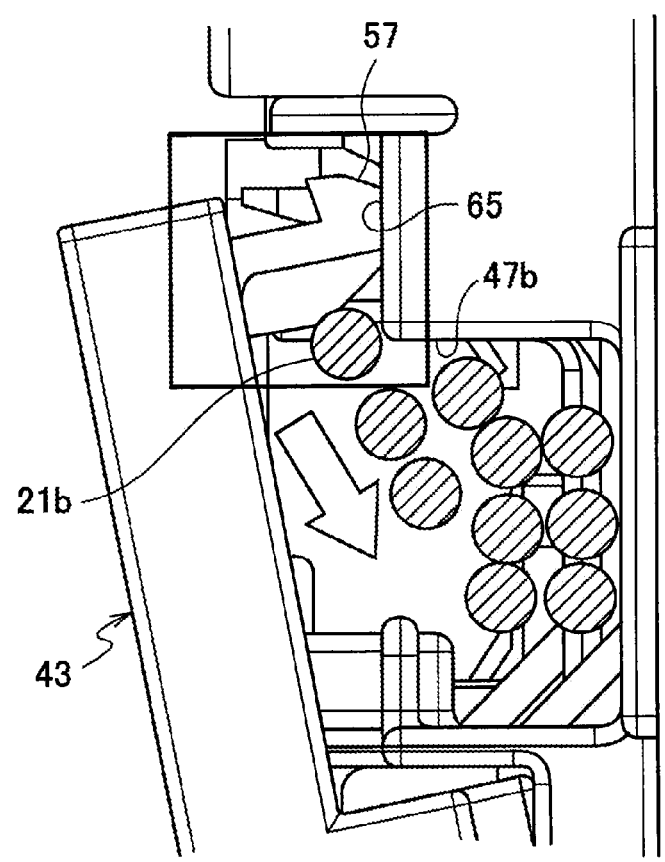
FIG. 9 is a cross-sectional view for explaining a state where the voltage detection wires are moved by the lock pins of the cover member.

However, in this embodiment, as illustrated in FIG. 6, the side surface of the lock pin 57 that faces the wiring path 33 when the cover member 43 is bent is provided with an inclined surface 67. As illustrated in FIG. 8, the inclined surface 67 is formed so that the cross-section of the lock pin 57 that is orthogonal to the insertion direction of the lock pin 57 is increased toward the base end side of the lock pin 57, that is, the base end side thereof widens toward the wiring path 33 when the lock pin 57 is inserted into the groove 65. By this configuration, as illustrated in FIG. 9, in the case where the cover member 43 is folded back and the lock pin 57 is inserted into the groove 65, a voltage detection wire 21b protruding in the vicinity of the groove 65 may be pushed back into the wiring path 33 along the inclined surface 67, so that the voltage detection wire 21b may be prevented from being caught between the lock pin 57 and the groove 65.

By the above configuration, the contact between the voltage detection wires and the connection terminal of the power cable can be avoided while suppressing the complexity of a structure of the busbar module unit.

What is claimed is:
1. A busbar module unit comprising:
   a plurality of first conductors that connect positive electrodes and negative electrodes of the adjacent batteries of a plurality of batteries connected in series;
   two second conductors respectively connected to a total positive electrode and a total negative electrode of a battery module constituted by the plurality of batteries;
   a busbar module that is made of a resin and retains the plurality of first conductors and the two second conductor in accordance with an arrangement of the batteries;
   a wiring path that accommodates a plurality of voltage detection wires respectively connected to the plurality of first conductors; and
   a terminal accommodating portion that accommodates connection terminals of a power cable respectively connected to the two second conductors; and
   a cover member that is connected to the busbar module via a hinge portion,
   wherein the wiring path is integrally formed with the busbar module;
   wherein the terminal accommodating portion is continuously formed with the cover member;

wherein the wiring path is arranged so as to intersect at least one of the connection terminals of the power cable;

wherein the cover member has a first face and a second face opposite to the first face;

wherein the first face of the cover member opposes the wiring path to cover the wiring path when the cover member is folded over the wiring path via the hinge portion; and wherein the terminal accommodating portion is formed on the second face.

2. The busbar module unit according to claim 1, wherein the wiring path is provided with a rib which guides the voltage detection wires.

3. The busbar module unit according to claim 1, wherein a side edge portion of the wiring path is provided with a groove communicating with the wiring path;

wherein a protrusion that is inserted and retained in the groove is provided on the first face of the cover member; and wherein an inclined surface is formed on a side surface of the protrusion facing the wiring path so that the cross-section of the protrusion is increased from an apex side toward a base end side of the protrusion.

4. The busbar module unit according to claim 1, wherein the plurality of first conductors and the wiring path are respectively arranged along a straight line extending between the two second conductors.

5. The busbar module unit according to claim 1, wherein in a state that the cover member is folded over the wiring path via the hinge portion, the wiring path covered by the cover member intersects with the connection terminals accommodated in the terminal accommodating portion in view from a direction perpendicular to the first face of the cover member.

* * * * *